United States Patent [19]
Newstead

[11] 3,780,836
[45] Dec. 25, 1973

[54] BRAKE ADJUSTER MECHANISMS

[75] Inventor: Charles Newstead, Tyseley, Birmingham, England

[73] Assignee: Girling Limited, Tyseley, Birmingham, England

[22] Filed: Apr. 30, 1971

[21] Appl. No.: 139,163

[30] Foreign Application Priority Data
May 1, 1970  Great Britain.................. 21,101/70

[52] U.S. Cl..................... 188/79.5 SC, 188/196 BA
[51] Int. Cl............................................ F16d 65/46
[58] Field of Search................ 188/79.5 S, 79.5 SC, 188/79.5 SS, 196 BA, 196 M

[56] References Cited
UNITED STATES PATENTS
| | | | |
|---|---|---|---|
| 1,926,379 | 9/1933 | Goepfrich | 188/79.5 SC |
| 2,294,293 | 8/1942 | Goepfrich | 188/79.5 SC |
| 3,381,779 | 5/1968 | Newstead | 188/79.5 SC |

Primary Examiner—Duane A. Reger
Attorney—Scrivener, Parker, Scrivener and Clarke

[57] ABSTRACT

A brake adjuster mechanism for drum brakes has a cylindrical housing in which a sleeve is rotatable but restrained against axial movement. The sleeve has an external threaded portion and an internal threaded portion of opposite hands. A tubular adjusting member formed with a tappet at one end and having an internally threaded portion screws over the sleeve with the tappet projecting from one end of the housing. An adjusting member in the form of a shaft formed with a tappet at one end screws within the sleeve with the tappet projecting from the other end of the housing. A worm gear arrangement is provided for rotating the sleeve relative to the housing and the adjusting members are thereby moving the adjusting members towards and away from each other. In the retracted position the adjusting members overlap by an amount nearly equal to the length of the sleeve.

3 Claims, 3 Drawing Figures

PATENTED DEC 25 1973 3,780,836

BRAKE ADJUSTER MECHANISMS

The invention relates to brake adjuster mechanisms for drum brakes.

In the past brake adjuster mechanisms have typically comprised a sleeve having internally threaded portions of opposite hand adjacent each end of the sleeve and two adjusting members in the form of externally threaded shafts projecting from opposite ends of the sleeve and engaging a respective screw thread in the sleeve. Rotation of the sleeve with respect to the adjusting members causes the adjusting members to move towards and away from each other.

The adjuster members are thus placed end to end, and in order to achieve a useful total displacement of these members, while also providing them with a useful degree of lateral support in their extended positions, the overall length of the mechanism tends to be substantial, and this is especially disadvantageous since space is invariably at a premium within the confines of the brake drum.

The present invention aims at providing a mechanism of more compact form and is characterised in that one of the adjusting members is an internally threaded tubular member which engages with an external screw thread on the sleeve, while the other adjusting member is an externally threaded shaft which engages with an internal thread within the sleeve. Such an arrangement allows the adjuster mechanism to be so constructed that, in the retracted state of the adjuster, the two adjusting members are telescopically nested relative to the sleeve and to each other over substantially the full length of the sleeve.

The adjusting members are formed or non-rotatably engageable at their outer ends with tappets which, in use, are engaged with opposed brake shoes which prevent rotation of the adjusting members relative to the housing.

One form of brake adjuster mechanism according to the invention will now be described, by way of example, with reference to the accompanying drawings in which.

Figure 3:
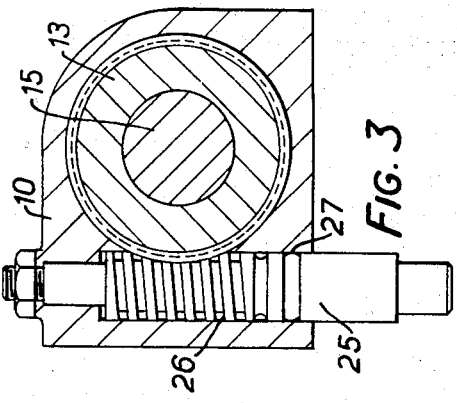
FIG. 3 is a section on the line A—A of FIG. 1.
Figure 1:
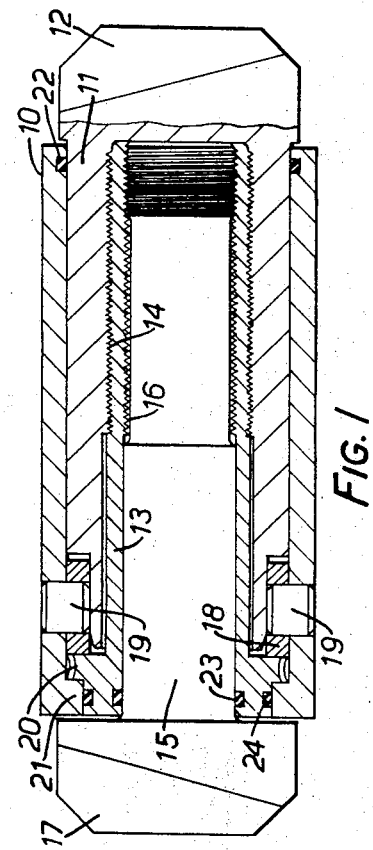
FIG. 1 shows an axial cross section of a brake adjuster mechanism according to the invention, in its fully retracted condition.
Figure 2:
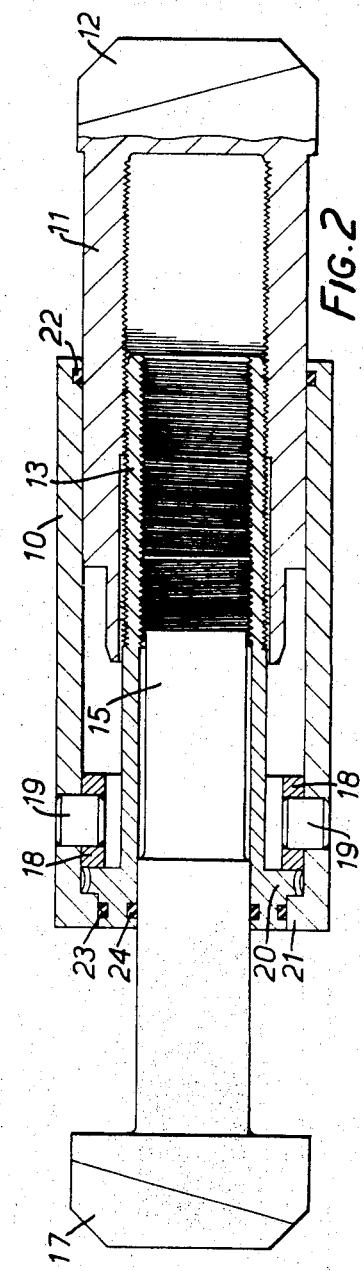
FIG. 2 shows the same brake adjuster mechanism in its fully expanded condition.

The adjuster consists of a housing 10 within which a tubular adjusting member in the form of a sleeve 11, having its outer end formed into a tappet 12, is slidable. A sleeve 13 is situated within the sleeve 11 and screw threadedly engages it by threads 14. An externally threaded adjusting member in the form of a shaft 15 is situated within the sleeve 13 and screw threadedly engages it by threads 16. The outer end of the shaft 15 is formed into a tappet 17. The two sets of threads 14 and 16 are of the same pitch but opposite hand.

The tappets 12 and 17 have slots in them which in use receive the webs of opposed brake shoes, so that the tappets are prevented from rotating. The sleeve 13 is free to rotate within the housing 10 and is restrained against axial movement by a ring 18 which is held to the housing by pegs 19 and which traps a flange 20 on the sleeve 13 against a shoulder 21 at the adjacent end of the housing 10.

Rotation of the sleeve 13 within the housing 10 causes the two tappets to move apart or together.

Rotation is effected through a worm gear which can be seen in FIG. 3. Worm gearing is formed on the outer surface of the flange 20 on the sleeve 13. A spindle 25 having a screw thread 26 is rotatable within a part of the housing 10 and the screw thread engages the worm gearing on the flange 20. The spindle is rotated manually by a key in order to effect adjustment of the brake shoes.

However, the spindle 25 could be arranged to be rotated automatically in response to the movement of the brake shoes or brake actuating mechanism in a conventional manner.

Seals 22, 23, 24 and 27 are provided between the sliding surfaces to prevent the ingress of dirt and moisture into the housing.

The screw threads 14 and 16 need not be of the same pitch, but could be different to compensate for different rates of wear of the two brake shoes.

The use of the sleeve 13 enables the two tappets 12 and 17 to be moved much further apart than in present known adjusters of similar overall retracted length, so that the sleeve 11 and shaft 15 barely overlap, i.e., each tappet is axially displaceable relative to the other tappet, by a distance substantially equal to the length of the screw threaded adjusting member carrying the tappet while substantial lateral support of each adjusting member is still maintained.

I claim:

1. In or for a vehicle brake, a brake adjuster mechanism comprising a fixed housing, an internally screw threaded tubular adjusting member extending out of one end of the housing and axially movable relative thereto, a sleeve member rotatably mounted in the housing, abutment means between said housing and sleeve member to restrain the latter against axial movement in both directions relative to said housing, and an externally screw threaded adjusting member extending out of the other end of said housing and movable axially relative thereto, said sleeve member having oppositely handed threaded engagements with the respective adjusting members, and means for rotating said sleeve member relative to said housing and said adjusting members to cause said adjusting members to move towards and away from each other.

2. A brake adjuster mechanism according to claim 1 wherein a tappet is carried by the outer end of each adjusting member, which tappets in use, are engaged with opposed brake shoes which prevent rotation of said adjusting members relative to the housing.

3. A brake adjuster mechanism according to claim 1, wherein said means for rotating said sleeve member includes an actuator member projecting from the housing adjacent one end thereof.

* * * * *